No. 836,052. PATENTED NOV. 13, 1906.
W. H. POOL.
INSECT DESTROYER.
APPLICATION FILED MAR. 19, 1906.

Witnesses
Inventor
W. H. Pool
By Geo. S. Vashon
Attorney

UNITED STATES PATENT OFFICE.

WILLIAM H. POOL, OF AMERICAN FORK, UTAH.

INSECT-DESTROYER.

No. 836,052.        Specification of Letters Patent.        Patented Nov. 13, 1906.

Application filed March 19, 1906. Serial No. 306,823.

*To all whom it may concern:*

Be it known that I, WILLIAM H. POOL, a citizen of the United States, residing at American Fork, in the county of Utah and State of Utah, have invented new and useful Improvements in Insect-Destroyers, of which the following is a specification.

This invention relates to a trap or insect-destroyer for catching flying insects or moths and embodying a suitable source of illumination for attracting the insects at night to a pan or receptacle for containing a fluid in close relation to the source of illumination and having an overhanging flange forming a darkening means with respect to the water in the pan and under which the insects attracted to and entering the trap will swim and finally drown.

The improved insect-trap is simple and effective in its construction and arrangement and can be readily cleaned and manufactured at a small cost.

Figure 1:
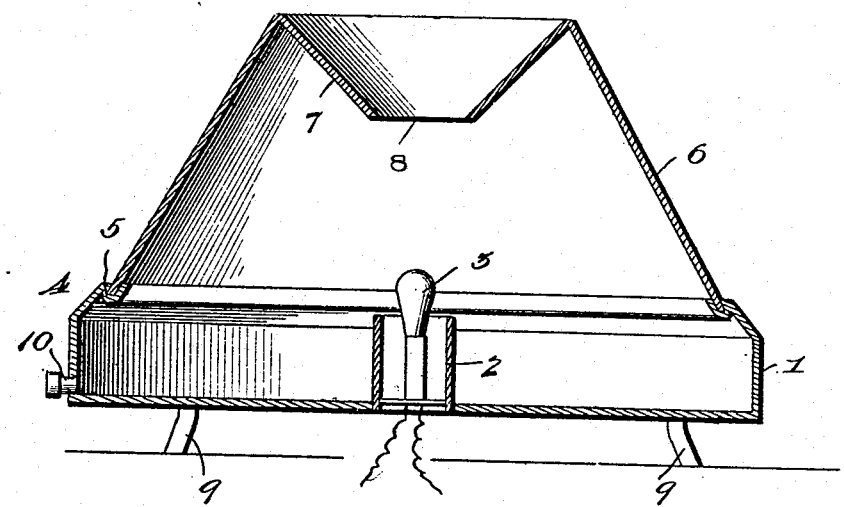
Figure 2:
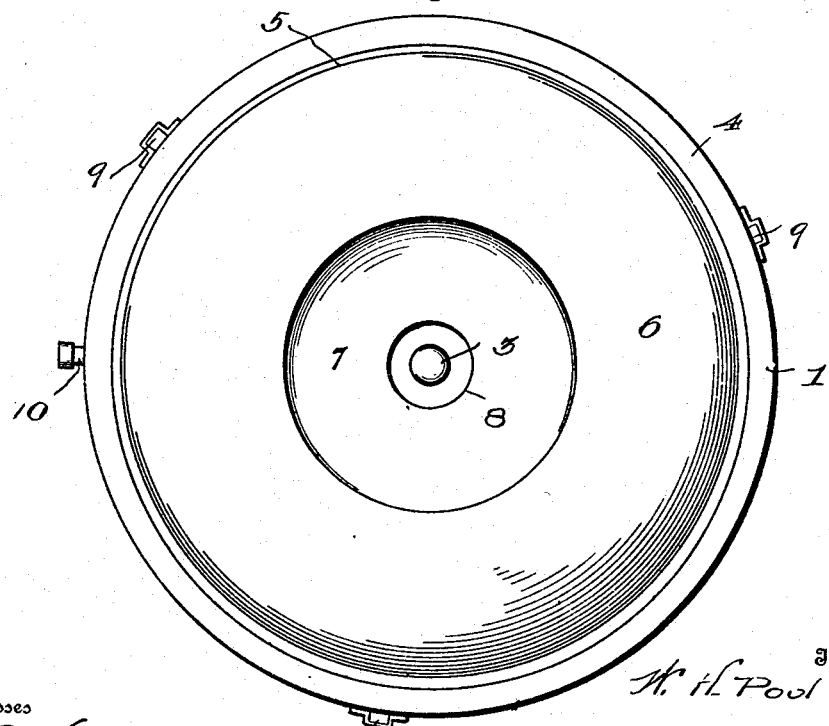

In the drawings, Figure 1 is a transverse vertical section of an insect-trap embodying the features of the invention. Fig. 2 is a top plan view of the same.

Similar numerals of reference are employed to indicate corresponding parts throughout the views.

The numeral 1 designates the body of the trap, which in the present instance consists of a water-pan having a centrally-inclosed light compartment or cylinder 2, in which an electric light 3 is shown arranged. It will be understood, however, that where the use of electricity is not available any illuminating device, such as a lamp, may be used. The pan or body 1 has an inwardly-projecting upwardly-inclined flange 4, preferably terminating in a seat 5 to receive a truncated conical cap or top closure 6, having its upper end struck inwardly and downwardly to form an inverted truncated conical inlet 7, with a central opening 8 directly over the source of illumination. The pan or body 1 is supported by suitable legs 9 and is also provided with a water-plug 10, whereby the contents thereof may be removed for cleaning purposes. Water may be readily disposed in the pan 1 by removing the cap or top closure 6, care being taken to have the water about on a level with the lower terminal of the flange.

After the trap has been arranged for operation the moths or other insects will be drawn through the inlet 7 toward the source of illumination in the center thereof and fall into the water within the pan 1 and finally after swimming about in the pan will become located under the flange 4 and in a darkened portion of the device. The insects arriving under the flange 4 and having the light shaded at such point will cause the insects to flounder and drown. There is no possible way for the insects to creep out of the trap after they are once caught.

The improved trap will be found exceptionally useful and in view of the simplicity thereof may be cheaply manufactured and sold. It is also intended to modify the proportions and dimensions thereof at will.

What I claim is—

1. An insect-trap comprising a pan with a central source of illumination, and an upper inwardly-inclined peripheral flange, and a top closure applied over the pan and having an upper central inlet-opening at the top.

2. An insect-trap having a pan with a central inclosure and an upper inwardly-projecting flange, a source of illumination disposed in said inclosure, and a cap removably fitted on the pan and held by the inner upper portion of the flange and provided with a central top inlet.

In testimony whereof I affix my signature in presence of two witnesses.

WILLIAM H. POOL.

Witnesses:
WILLIAM KERSHAW,
WILLIAM E. DICKERSON.